United States Patent
Chun (10) Patent No.: US 9,043,213 B2
(45) Date of Patent: May 26, 2015

(54) SPEECH RECOGNITION AND SYNTHESIS UTILIZING CONTEXT DEPENDENT ACOUSTIC MODELS CONTAINING DECISION TREES

(75) Inventor: Byung Ha Chun, Cambridge (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 1157 days.

(21) Appl. No.: 13/014,185

(22) Filed: Jan. 26, 2011

(65) Prior Publication Data

US 2011/0218804 A1 Sep. 8, 2011

(30) Foreign Application Priority Data

Mar. 2, 2010 (GB) .................................. 1003496.5

(51) Int. Cl.
*G10L 15/14* (2006.01)
*G10L 13/02* (2013.01)
*G10L 13/027* (2013.01)
(Continued)

(52) U.S. Cl.
CPC ............ *G10L 15/187* (2013.01); *G10L 15/14* (2013.01); *G06F 17/289* (2013.01); *G10L 13/08* (2013.01); *G10L 15/07* (2013.01); *G10L 15/144* (2013.01)

(58) Field of Classification Search
CPC ....... G10L 13/02; G10L 13/08; G10L 15/065; G10L 15/14
USPC ................. 704/251, 257, 258, 260, 277, 255
See application file for complete search history.

(56) References Cited

U.S. PATENT DOCUMENTS 5,715,367 A 2/1998 Gillick et al.
6,151,575 A * 11/2000 Newman et al. .............. 704/260

(Continued)

FOREIGN PATENT DOCUMENTS

EP 0 856 835 A2 8/1998
EP 0 856 835 A3 8/1998

(Continued)

OTHER PUBLICATIONS

Shen, Haifeng, et al. "Environment compensation based on maximum a posteriori estimation for improved speech recognition." MICAI 2005: Advances in Artificial Intelligence. Springer Berlin Heidelberg, 2005, pp. 854-862.*

Hauptmann, Alexander, et al. "Multi-lingual broadcast news retrieval." Mar. 2007, pp. 1-12.*

Japanese Office Action Issued Feb. 7, 2012 in Patent Application No. 2011-045161 (with English translation).

(Continued)

*Primary Examiner* — James Wozniak
(74) *Attorney, Agent, or Firm* — Oblon, McClelland, Maier & Neustadt, L.L.P.

(57) ABSTRACT

A speech recognition method including the steps of receiving a speech input from a known speaker of a sequence of observations and determining the likelihood of a sequence of words arising from the sequence of observations using an acoustic model. The acoustic model has a plurality of model parameters describing probability distributions which relate a word or part thereof to an observation and has been trained using first training data and adapted using second training data to said speaker. The speech recognition method also determines the likelihood of a sequence of observations occurring in a given language using a language model and combines the likelihoods determined by the acoustic model and the language model and outputs a sequence of words identified from said speech input signal. The acoustic model is context based for the speaker, the context based information being contained in the model using a plurality of decision trees and the structure of the decision trees is based on second training data.

11 Claims, 9 Drawing Sheets

(51) Int. Cl.
*G10L 15/187* (2013.01)
*G06F 17/28* (2006.01)
*G10L 13/08* (2013.01)
*G10L 15/07* (2013.01)
*G10L 15/06* (2013.01)

(56) References Cited

U.S. PATENT DOCUMENTS

| | | | |
|---|---|---|---|
| 6,442,519 B1* | 8/2002 | Kanevsky et al. | 704/243 |
| 6,574,597 B1* | 6/2003 | Mohri et al. | 704/251 |
| 7,472,064 B1 | 12/2008 | Guo et al. | |
| 2001/0056347 A1* | 12/2001 | Chazan et al. | 704/258 |
| 2002/0123891 A1 | 9/2002 | Epstein | |
| 2005/0228666 A1* | 10/2005 | Liu et al. | 704/256 |
| 2006/0074657 A1* | 4/2006 | Huang | 704/246 |
| 2006/0149558 A1* | 7/2006 | Kahn et al. | 704/278 |
| 2006/0200351 A1* | 9/2006 | Acero et al. | 704/254 |
| 2007/0033027 A1* | 2/2007 | Yao | 704/233 |
| 2007/0061152 A1* | 3/2007 | Doi | 704/277 |
| 2008/0059200 A1* | 3/2008 | Puli | 704/277 |
| 2009/0119103 A1* | 5/2009 | Gerl et al. | 704/243 |
| 2009/0119105 A1* | 5/2009 | Kim et al. | 704/244 |
| 2009/0299747 A1* | 12/2009 | Raitio et al. | 704/264 |
| 2010/0169094 A1* | 7/2010 | Akamine et al. | 704/244 |
| 2011/0054903 A1* | 3/2011 | Yan et al. | 704/260 |

FOREIGN PATENT DOCUMENTS

| | | |
|---|---|---|
| EP | 1 205 907 A2 | 5/2002 |
| EP | 1 205 907 A3 | 5/2002 |
| JP | 2000-298495 A | 10/2000 |
| JP | 2001-195084 A | 7/2001 |
| JP | 2008-58679 A | 3/2008 |
| WO | WO 2004/047077 A1 | 6/2004 |
| WO | WO 2010/035892 A1 | 4/2010 |

OTHER PUBLICATIONS

Satoru Muto et al., "Speaker Adaptation in HMM-based Singing Voice Synthesis and High-Speed Model Learning through Use of Musical Note Data", The Acoustical Society of Japan, Proceedings CD-ROM, 2010 Spring Symposium, Mar. 1, 2010, pp. 347-348.

Junichi Yamagishi et al., "Speaker adaptation using context clustering decision tree for HMM-based speech synthesis", The Institute of Electronics, Information and Communication Engineers, vol. 103, No. 264, Aug. 15, 2003, pp. 31-36.

Koichi Shinoda, "Statistical Approach for Acoustic Modeling, and Its Application to Speech Recognition", Joho Shori, vol. 45, No. 10, Oct. 15, 2004, pp. 1012-1019.

Kei Hashimoto et al., "Bayesian HMM Speech Synthesis Using Cross Validation", The Acoustical Society of Japan, Proceedings CD-ROM, 2008 Autumn Symposium, Sep. 3, 2008, pp. 251-252.

Kei Hashimoto et al., "Bayesian Context Clustering Using Cross Validation", The Acoustical Society of Japan, Proceedings CD-ROM, 2008 Spring Symposium, Mar. 10, 2008, pp. 69-70.

Office Action issued Nov. 20, 2012 in Japanese Patent Application No. 2011-045161 with English language translation.

Taiki Sannou et al., "Discussion on Diversification of Speech Style by Structural MAPLR in HMM Voice Synthesis", Collection of Articles in Lectures at Spring Meeting 2004 of the Acoustical Society of Japan, Mar. 17, 2004, pp. 257-258 with partial English translation.

United Kingdom Search Report issued Jun. 11, 2010, in Patent Application No. GB1003496.5.

S. J. Young, et al., "Tree-Based State Tying for High Accuracy Acoustic Modelling", HLT '94 Proceedings of the Workshop on Human Language Technology, Mar. 8-11, 1994, pp. 307-312.

Rusheng Hu, et al., "Bayesian Decision Tree State Tying for Conversational Speech Recognition", Proc. Interspeech ICSLP, 2006, pp. 1738-1741.

Takashi Masuko, et al., "Voice Characteristics Conversion for HMM-Based Speech Synthesis System", Proc. of ICASSP, Apr. 1997, pp. 1611-1614.

* cited by examiner

BACKGROUND ART

Figure 1

BACKGROUND ART

BACKGROUND ART

Figure 5

BACKGROUND ART

SPEECH RECOGNITION AND SYNTHESIS UTILIZING CONTEXT DEPENDENT ACOUSTIC MODELS CONTAINING DECISION TREES

CROSS REFERENCE FOR RELATED APPLICATIONS

This application is based upon and claims the benefit of priority from UK patent application No. 1003496.5 filed 2 Mar. 2010, the entire contents of which are incorporated herein by reference.

FIELD

Embodiments described herein relate generally to processing both speech recognition and text-to-speech synthesis.

BACKGROUND

An inherent problem with speech recognition or speech synthesis in many languages is the fact that a given phoneme may be pronounced differently depending on its context. For example, the plosive phoneme "g" is pronounced differently in the word "gauge". To address this problem context dependent acoustic models have been widely used.

As the number of contexts increases, the number of combinations of contexts also increases exponentially. It is almost impossible to have all possible combinations of contexts in a limited amount of training or adaptation data. To address this problem, the decision tree based context clustering technique has been used. Here similar states of HMMs are clustered into a small number of clusters using decision trees. The decision trees are usually built on maximum likelihood (ML) criteria. By traversing constructed decision trees, unseen combinations of contexts in the training data can be assigned to a leaf node of a decision tree. Model parameters are also estimated in the decision tree clustering process based on the ML criteria.

When the model is adapted to a speaker, model parameters are transformed or updated based on a criterion. Maximum likelihood linear regression or maximum a posteriori criterion is often used. To adapt general acoustic model of hidden Markov-model-based statistical parametric speech synthesis systems to a target voice characteristics, speaking styles, and/or emotions, linear transformation of model parameters (e.g. various variants of maximum-likelihood linear regressions) are used. These techniques linearly transform mean vectors and covariance matrices associated to states of hidden Markov models based on some criterion such as the maximum likelihood criterion.

In the adaptation stage, constructed decision trees are fixed and they are built from the original training data which is different to the adaptation data. If training data and adaptation data have very different context-dependency, it is not possible to model the context-dependency of adaptation data. For example, if the general model is trained by neutral voices and adaptation data is an expressive voice, to control the expressiveness, expressiveness may be modelled as contexts. However, if the general acoustic model has no expressiveness contexts, the model cannot be properly adapted to the expressive voice.

BRIEF SUMMARY OF THE INVENTION

Not Applicable

DETAILED DESCRIPTION

According to one embodiment a speech recognition method is provided, said method comprising:

receiving a speech input from a known speaker which comprises a sequence of observations; and determining the likelihood of a sequence of words arising from the sequence of observations using an acoustic model, said acoustic model having a plurality of model parameters describing probability distributions which relate a word or part thereof to an observation, said acoustic model having been trained using first training data and adapted using second training data to said speaker, the speech recognition method further comprising determining the likelihood of a sequence of observations occurring in a given language using a language model; and combining the likelihoods determined by the acoustic model and the language model and outputting a sequence of words identified from said speech input signal, wherein said acoustic model is context based for said speaker, said context based information being contained in said model using a plurality of decision trees, wherein the structure of said decision trees is based on second training data.

In another embodiment a text to speech processing method is provided, said method comprising:

receiving a text input which comprises a sequence of words; and determining the likelihood of a sequence of speech vectors arising from the sequence of words using an acoustic model, said acoustic model having a plurality of model parameters describing probability distributions which relate a word or part thereof to an observation, said acoustic model having been trained using first training data and adapted using second training data to said speaker, wherein said acoustic model is context based for said speaker, said context based information being contained in said model using a plurality of decision trees, wherein the structure of said decision trees is based on second training data.

For both of the above embodiments, decision trees themselves are adapted based on the adaptation data, therefore their structure is influenced by the adaptation data and it is possible to model contexts which were not present in the original training data. For the avoidance of doubt, the structure of the decision trees comprises both the order of the nodes and the size of the splitting at the nodes. A decision tree is constructed so that the division of a node which gives the largest splitting is provided at the root of the tree and branches are arranged so that they give smaller and smaller splittings towards the leaf nodes.

In an embodiment, the structure of the decision trees is based on both the first and second training data.

In a further embodiment, the structure is determined from the splitting of the nodes of the trees and has been calculated using maximum a posteriori criteria. Here, both decision trees and model parameters are jointly adapted to the adaptation data based on the maximum a posteriori criterion. This allows re-building of decision trees for the adaptation data. Furthermore, because the statistics of both general and adaptation data are used, a better estimate of model parameters can be obtained. This produces statistically reliable estimates of model parameters and decision trees for given adaptation data. The use of this technique will give better model to synthesize speech with various voice characteristics, speaking styles, and emotions with a limited amount of adaptation data.

The method achieves high-quality statistical parametric text-to-speech synthesis with various voice characteristics, speaking styles and/or emotions using a limited amount of adaptation data. It jointly estimates model parameters and decision trees, which are the essential parts of hidden Markov model-base statistical parametric speech synthesis systems, based on the maximum a posteriori criterion. It finds decision trees suitable for the given adaptation data using the statistics of both general and adaptation data. It also re-estimates model parameters from the statistics of both general and adaptation data. The method can estimate statistically reliable decision trees and model parameters from the limited amount of adaptation data.

The splitting may be calculated using maximum a posteriori criteria implemented as:

$$(\hat{m}_{MAP}, \hat{\lambda}_{MAP}) = \underset{m,\lambda}{\mathrm{argmax}}\{\log p(O \mid m, \lambda) + \alpha \cdot \log p(O' \mid m, \lambda)\}$$

Where O' is the first training data, O is the second training data, m denotes a parameter tying structure, $\lambda$ is a set of HMM parameters, $\hat{m}_{MAP}$ denotes the parameter tying structure under maximum a posteriori criteria, $\hat{\lambda}_{MAP}$ are the HMM parameters under maximum a posteriori criteria and $\alpha$ is a parameter to be set.

Although the criteria described above are based on MAP, it is also possible to use other techniques, for example discriminative adaptation methods such as minimum phoneme error criteria, maximum mutual information criteria etc. In practice, any adaptation technique could be used, providing that it constructs a decision tree.

The context dependency may be implemented as triphones, but higher or lower order phonemes are also possible.

The acoustic model comprises probability distributions which are represented by means and variances, in one embodiment decision trees are provided for both means and variances. However, in some implementations, only decision trees for means may be constructed from the adaptation data.

The context based information may be selected from phonetic, linguistic and prosodic contexts.

The decision trees may be used to model expressive contexts, or other contexts for example, gender, age, voice characteristics, etc.

According to a further embodiment, a method of training an acoustic model for a speech processing system is provided, the method comprising:

receiving first training data, said first training data comprising speech and text corresponding to said speech;
training a first acoustic model using said first training data;
receiving second training data from a known speaker;
adapting said first acoustic model to form a second acoustic model using said second training data,
wherein adapting said first model to form said second model comprises constructing decision trees to model context dependency, and wherein the structure of the decision trees is based on the second training data.

Training of the first and second acoustic model may be performed such that the end user receives a product which has been trained using both first and second training data. However, it is also possible for a product to be given to the end user which has been trained just using first training data and where the end user or other intermediary trains the product using second training data. Thus, the method may further comprise storing the first acoustic model such that adaptation to the second acoustic model can be performed at a different location.

In an embodiment, training said first acoustic model comprises: initialising a plurality of Hidden Markov Models; re-estimating the HMMs on the basis of the first training data; and construct decision trees to model contexts in said first training data.

The training of said first model may further comprise re-estimating the HMMs clustered by the decision trees. However, this step may be omitted, especially if the model is being trained for a text to speech system.

Training the second model may comprise: deriving HMMs parameters for said second model by running the forward-backward algorithm on said second training data and said first training data; scaling the statistics obtained from the first training data using a parameter; and constructing decision trees using said first and second training data.

The training of said second model may further comprise re-estimating the HMMs clustered by the decision trees. However, this step may be omitted, especially if the model is being trained for a text to speech system.

The parameter may be determined by trial and error.

According to a further embodiment a speech recognition apparatus is provided comprising:

a receiver for receiving a speech input from a known speaker which comprises a sequence of observations; and a processor configured to:

determine the likelihood of a sequence of words arising from the sequence of observations using an acoustic model, said acoustic model having a plurality of model parameters describing probability distributions which relate a word or part thereof to an observation, said acoustic model having been trained using first training data and adapted using second training data to said speaker, determine the likelihood of a sequence of observations occurring in a given language using a language model; and combine the likelihoods determined by the acoustic model and the language model and outputting a sequence of words identified from said speech input signal, wherein said acoustic model is context based for said speaker, said context based information being contained in said model using a plurality of decision trees, wherein the structure of said decision trees is based on second training data.

According to a further embodiment, a text to speech system is provided comprising:

a receiver for receiving a text input which comprises a sequence of words; and a processor, said processor being configured to:

determine the likelihood of a sequence of speech vectors arising from the sequence of words using an acoustic model, said acoustic model having a plurality of model parameters describing probability distributions which relate a word or part thereof to an observation, said acoustic model having been trained using first training data and adapted using second training data to said speaker, wherein said acoustic model is context based for said speaker, said context based information being contained in said model using a plurality of decision trees, wherein the structure of said decision trees is based on second training data.

The above can be applied to a speech to speech translation system, said system comprising a speech recognition system according to the above embodiment configured to recognise speech in a first language, a translation module configured to translate text received in a first language into text of a second language and a text to speech system as also described above configured to output speech in said second language.

The translation module could be any of the well known automatic translation or machine translation systems.

Embodiments of the present invention can be implemented either in hardware or on software in a general purpose computer. Further embodiments of the present invention can be implemented in a combination of hardware and software. Embodiments of the present invention can also be implemented by a single processing apparatus or a distributed network of processing apparatuses.

Since embodiments of the present invention can be implemented by software, embodiments of the present invention encompass computer code provided to a general purpose computer on any suitable carrier medium. The carrier medium can comprise any storage medium such as a floppy disk, a CD ROM, a magnetic device or a programmable memory device, or any transient medium such as any signal e.g. an electrical, optical or microwave signal.

The above acoustic models will preferably be HMM based models, but other models may also be used.

Figure 1:
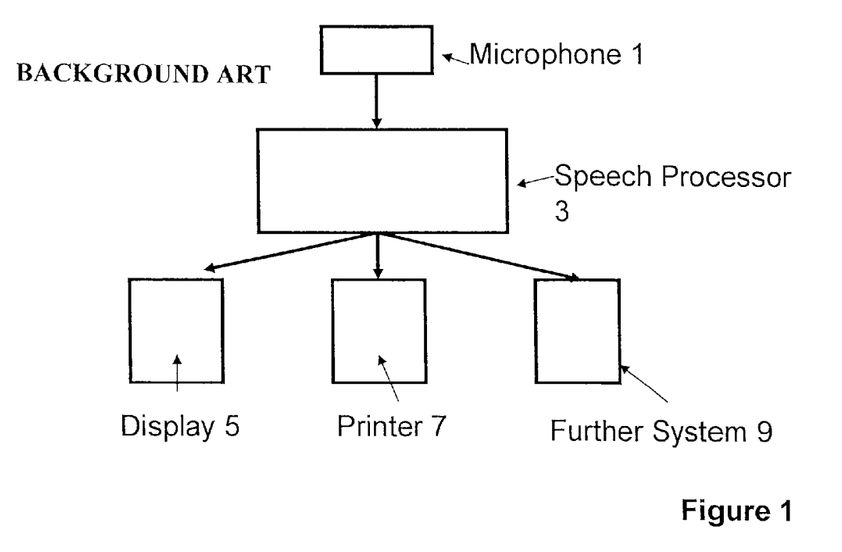
FIG. 1 is a schematic of a very basic speech recognition system.

FIG. 1 is a schematic of a very basic speech processing system, the system of FIG. 1 has been configured for speech recognition. A user (not shown) speaks into microphone 1 or other collection device for an audio signal. The device 1 could be substituted by a memory which contains audio data previously recorded or the device 1 may be a network connection for receiving audio data from a remote location.

The speech signal is then directed into a speech processor 3 which will be described in more detail with reference to FIG. 2.

The speech processor 3 takes the speech signal and turns it into text corresponding to the speech signal. Many different forms of output are available. For example, the output may be in the form of a display 5 which outputs to a screen. Alternatively, the output could be directed to a printer 7 or the like. Also, the output could be in the form of an electronic signal which is provided to a further system 9. For example, the further system 9 could be part of a speech translation system which takes the outputted text from processor 3 and then converts it into a different language. The converted text is then outputted via a further text or speech system.

Alternatively, the text outputted by the processor 3 could be used to operate different types of equipment, for example, it could be part of a mobile phone, car, etc. where the user controls various functions via speech.

Figure 2:
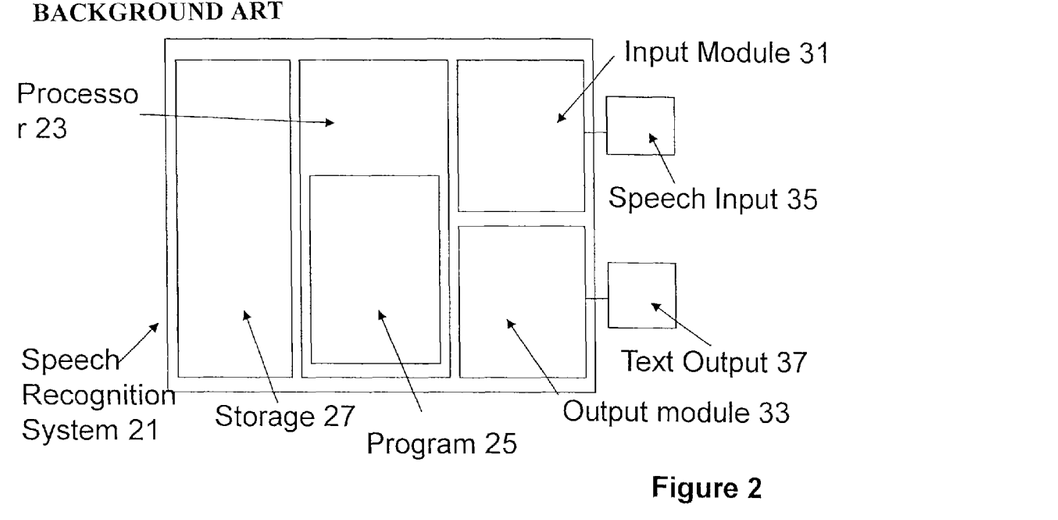
FIG. 2 is a schematic of the architecture of a speech recognition processor for implementing the model of FIG. 1.

FIG. 2 shows a possible basic architecture for speech a recognition system. The speech recognition comprises a processor 23 which executes a program 25. Speech recognition system 21 further comprises storage 27. The storage 27 stores data which is used by program 25 to convert text to speech. The text to speech system 21 further comprises an input module 11 and an output module 33. The input module 31 is connected to a speech input 35. Speech input 35 receives speech. The speech input 35 may be for example a microphone. Alternatively, speech input 35 may be a means for receiving speech data from an external storage medium or a network.

Connected to the output module 33 is output for text 37. The text output 37 is used for outputting text converted from speech input 33. The text output 37 may be for example a direct text e.g. a monitor, printer or an output for a data file which may be sent to a storage medium, networked etc.

In use, the speech recognition system 21 receives speech through speech input 33. The program 25 executed on processor 23 converts the speech into text data using data stored in the storage 27. The text is output via the output module 35 to text output 37.

Figure 3:
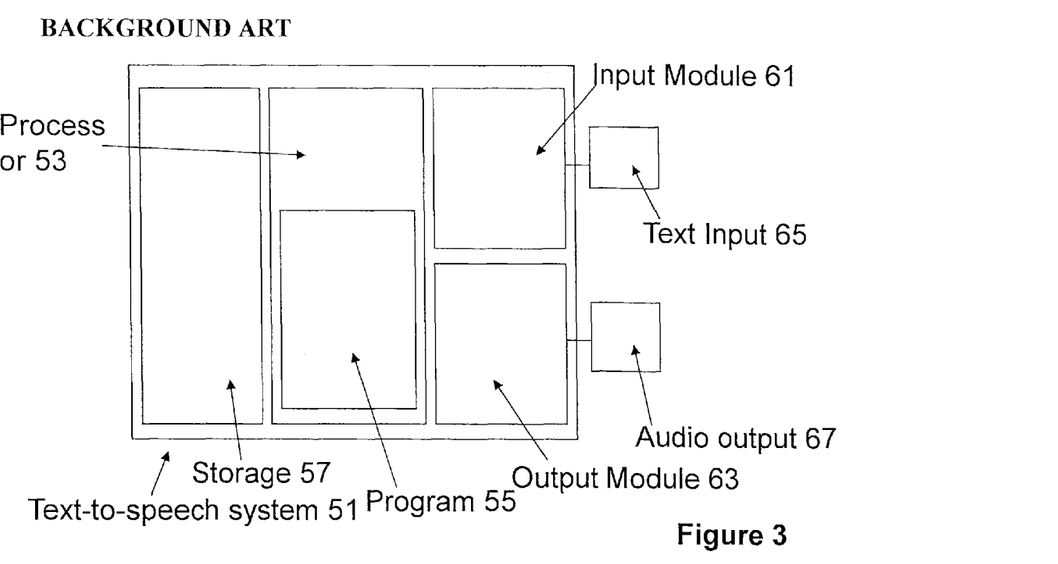
FIG. 3 is a schematic of the architecture of a processor configured for text-to-speech synthesis.

The present invention may also be applied to speech synthesis as well as speech recognition. FIG. 3 shows the basic architecture of a text to speech system 51. The text to speech system 51 comprises a processor 53 which executes a program 55. Text to speech system 51 further comprises storage 57. The storage 57 stores data which is used by program 55 to convert text to speech. The text to speech system 51 further comprises an input module 61 and an output module 63. The input module 61 is connected to a text input 65. Text input 65 receives text. The text input 65 may be for example a keyboard. Alternatively, text input 65 may be a means for receiving text data from an external storage medium or a network.

Connected to the output module 63 is output for audio 67. The audio output 67 is used for outputting a speech signal converted from text input into text input 63. The audio output 67 may be for example a direct audio output e.g. a speaker or an output for an audio data file which may be sent to a storage medium, networked etc.

In use, the text to speech system 51 receives text through text input 63. The program 55 executed on processor 53 coverts the text into speech data using data stored in the storage 57. The speech is output via the output module 65 to audio output 67.

Figure 4:
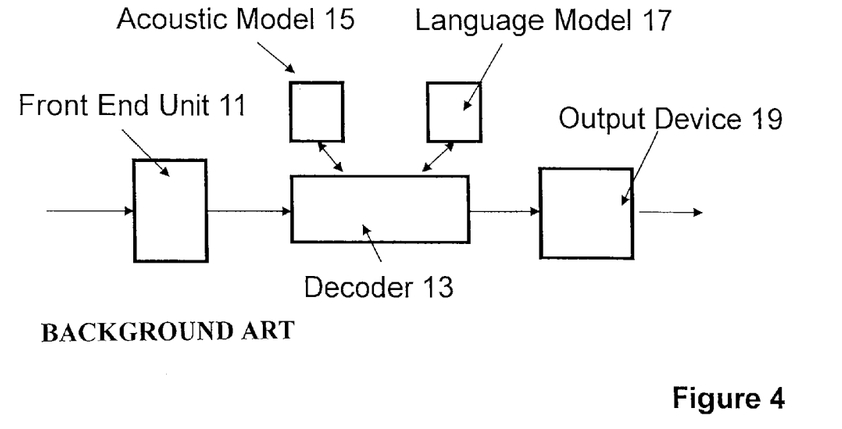
FIG. 4 is a block diagram of the standard components of a speech recognition processor of the type shown in FIG. 1.

FIG. 4 is a block diagram of the standard components of a speech recognition processor 3 of the type shown in FIG. 1. The speech signal received from microphone, through a network or from a recording medium 1 is directed into front-end unit 11.

The front end unit 11 digitises the received speech signal and splits it into frames of equal lengths. The speech signals are then subjected to a spectral analysis to determine various parameters which are plotted in an "acoustic space". The parameters which are derived will be discussed in more detail later.

The front end unit 11 also removes signals which are believed not to be speech signals and other irrelevant information. Popular front end units comprise apparatus which use filter bank (F BANK) parameters, MelFrequency Cepstral Coefficients (MFCC) and Perceptual Linear Predictive (PLP) parameters. The output of the front end unit is in the form of an input vector which is in n-dimensional acoustic space.

The input vector is then fed into a decoder 13 which cooperates with both an acoustic model section 15 and a language model section 17. The acoustic model section 15 will generally operate using Hidden Markov Models. However, it is also possible to use acoustic models based on connectionist models and hybrid models.

The acoustic model unit 15 derives the likelihood of a sequence of observations corresponding to a word or part thereof on the basis of the acoustic input alone.

The language model section 17 contains information concerning probabilities of a certain sequence of words or parts of words following each other in a given language. Generally a static model is used. The most popular method is the N-gram model.

The decoder 13 then traditionally uses a dynamic programming (DP) approach to find the best transcription for a given speech utterance using the results from the acoustic model 15 and the language model 17.

This is then output via the output device 19 which allows the text to be displayed, presented or converted for further use e.g. in speech to speech translation or to control a voice activated device.

This description will be mainly concerned with the use of an acoustic model which is a Hidden Markov Model (HMM). However, it could also be used for other models.

The actual model used in this embodiment is a standard model, the details of which are outside the scope of this patent application. However, the model will require the provision of probability density functions (pdfs) which relate to the probability of an observation represented by an acoustic vector being related to a word or part thereof. Generally, this probability distribution will be a Gaussian distribution in n-dimensional space.

Figure 5:
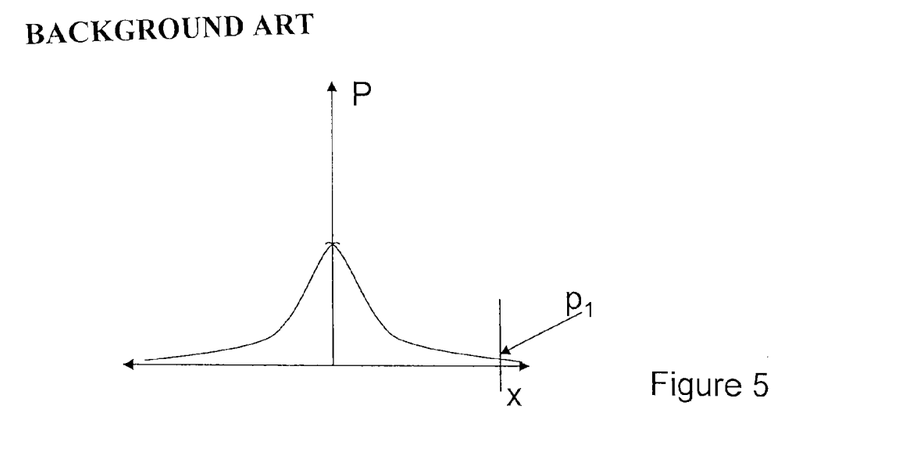
FIG. 5 is a plot of a Gaussian distribution relating a particular word or part thereof to an observation.

A schematic example of a generic Gaussian distribution is shown in FIG. 5. Here, the horizontal axis corresponds to a parameter of the input vector in one dimension and the probability distribution is for a particular word or part thereof relating to the observation. For example, in FIG. 5, an observation corresponding to an acoustic vector x has a probability p1 of corresponding to the word whose probability distribution is shown in FIG. 5. The shape and position of the Gaussian is defined by its mean and variance. These parameters are determined during training for the vocabulary which the acoustic model, they will be referred to as the "model parameters".

In a HMM, once the model parameters have been determined, the model can be used to determine the likelihood of a sequence of observations corresponding to a sequence of words or parts of words.

Figure 6:
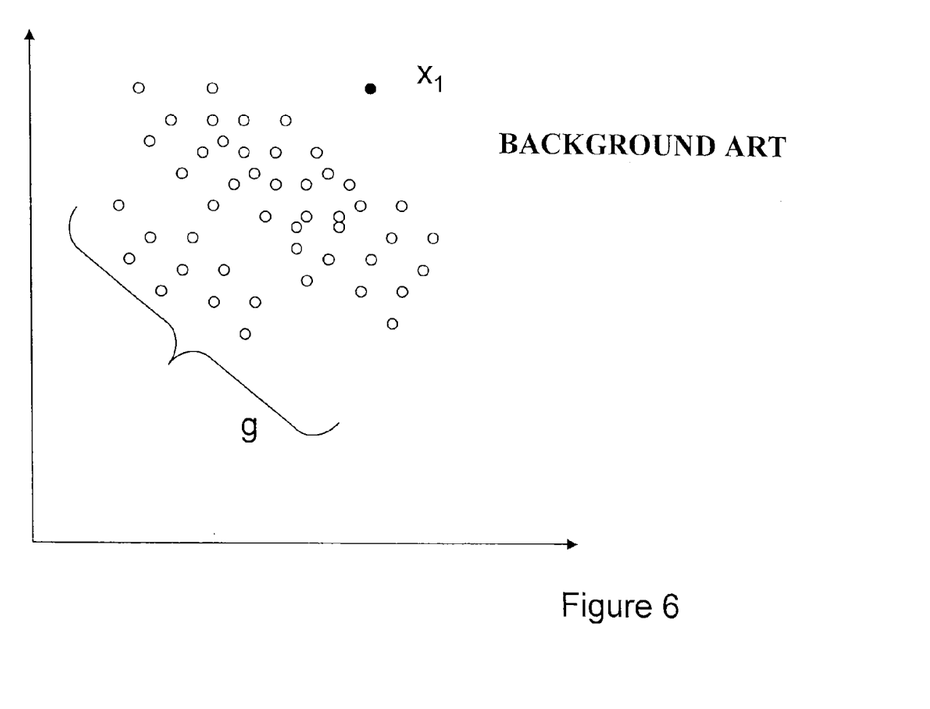
FIG. 6 is a schematic plot of acoustic space.

FIG. 6 is schematic plot of acoustic space where an observation is represented by an observation vector or feature vector $x_1$. The open circles g correspond to the means of Gaussians or other probability distribution functions plotted in acoustic space.

During decoding, the acoustic model will calculate a number of different likelihoods that the feature vector $x_1$ corresponds to a word or part thereof represented by the Gaussians. These likelihoods are then used in the acoustic model and combined with probabilities from the language model to determine the text spoken.

Most of state-of-the art speech recognition systems are based on the statistical framework, finding the most likely word sequence, ω, for a sequence of speech parameters, o, which are expressed as feature vectors extracted from an input speech. Which can be written as:

$$\hat{w} = \underset{w}{\operatorname{argmax}}\, p(w \mid o) \tag{1}$$

where ρ(ω|o) is a posteriori probability distribution of ω for a given o. Because it is difficult to model ρ(ω|o) directly, the following reformulation based on the Bayes' rule is often used:

$$\hat{w} = \underset{w}{\operatorname{argmax}}\, p(w \mid o) \tag{2}$$

$$= \underset{w}{\operatorname{argmax}}\, \frac{p(w, o)}{p(o)} \tag{3}$$

$$= \underset{w}{\operatorname{argmax}}\, \frac{p(o \mid w) p(w)}{p(o)} \tag{4}$$

where ρ(o) is a marginal n of o (often called as "evidence"). ρ(o) is independent of the maximization, Eq. (4) can be rewritten as $$\hat{w} = \underset{w}{\operatorname{argmax}}\, p(o \mid w) p(w) \tag{5}$$

Most of speech recognition systems consists of three modules (see FIG. 4) to perform the maximum in Eq. (5), which are an acoustic model for ρ(o|ω), a language model for ρ(ω), and a decoder to search the best word sequence.

The statistical speech synthesis can be written as follows:

$$\hat{o} = \underset{w}{\operatorname{argmax}}\, p(o \mid w) \tag{6}$$

Unlike the speech recognition, transformation by the Bayes' rule is not required in the statistical speech synthesis for the type of unit described with reference to FIG. 3. Basically it consists of acoustic model only. The acoustic model described herein is relevant to both speech recognition and speech synthesis.

In both statistical speech recognition and synthesis, context-dependent hidden Markov models (HMMs) are widely used as their acoustic models because of its efficiency and capability. The maximum likelihood (ML) criterion is one of the most popular criteria to estimate HMM parameters and build decision trees, which define HMM state-level parameter tying structure to reduce the number of parameters to be estimated. The ML estimation of HMM parameters can be written as $$\hat{\lambda}_{ML} = \underset{\lambda}{\operatorname{argmax}}\, p(O \mid \lambda) \tag{7}$$

where λ is a set of HMM parameters and O is a set of training data. It is known that HMMs estimated based on the ML criterion sometimes overfit to the training data. One possible solution of overfitting problem is to use the maximum a posteriori (MAP) estimation. The MAP estimation of HMM parameters can be written as $$\hat{\lambda}_{MAP} = \underset{\lambda}{\operatorname{argmax}}\, p(\lambda \mid O) \tag{8}$$

where $\rho(\lambda|O)$ is a posteriori probability of $\lambda$ for a given O. Equation (8) can be reformulated by Bayes' rule as:

$$\hat{\lambda}_{MAP} = \underset{\lambda}{\mathrm{argmax}}\, p(\lambda \mid O) \tag{9}$$

$$= \underset{\lambda}{\mathrm{argmax}}\, \frac{p(\lambda, O)}{p(O)} \tag{10}$$

$$= \underset{\lambda}{\mathrm{argmax}}\, \frac{p(O \mid \lambda)p(\lambda)}{p(O)}. \tag{11}$$

where $\rho(\lambda)$ is a prior distribution of $\lambda$. Because the numerator of Eq. (11) is independent of maximization, it can be rewritten as $$\hat{\lambda}_{MAP} = \underset{\lambda}{\mathrm{argmax}}\, p(O \mid \lambda)p(\lambda) \tag{12}$$

The main advantage of the MAP estimation over the ML criterion is the capability to use the prior art distribution. By incorporating the prior knowledge about data to the prior distribution, it can avoid the overfitting to the training data. The MAP estimation has been used to adapt ML-estimated speaker-independent HMMs to a target speaker both in speech recognition and synthesis.

Conventionally, MAP estimation has been used only parameter estimation. For decision tree-based context clustering, which is one of the essential part for training context-dependent HMMs, the ML criterion has been used. In an embodiment in accordance with a method of the present invention, a joint estimation technique of HMM parameters and decision trees based on the MAP criterion is used. The use of the MAP criterion allows incorporation of the prior knowledge about both HMM parameters and decision trees as its joint prior distribution while estimating model parameters and decision trees.

As an example, the plosive phone "g" is pronounced differently in the two instances it is using the word "gauge". The phonemes can be thought of as being divided into different groups such as plosives, b, d, g, k, p, t, the fricatives dh, th, f, v, s, sh, z, zh, the nasals m, em, n, en, ng and other groups have been identified. A decision tree can be set for example by asking questions concerning the group to which the preceding and succeeding phoneme belong. Therefore, by building these trees, it is possible to model for all instances of language and to cope with different pronunciation of phonemes in different context.

In both HMM-based speech recognition and synthesis systems, context-dependent phoneme HMMs (e.g. triphone HMMs) are widely used. The use of context-dependent phoneme HMMs rather than context-independent ones (monophones) is known to provide higher recognition performance. While the large number of context-dependent HMMs can help to capture variations in speech data, it results in too many parameters to be estimated in a system and causes the overfitting to the training data. Therefore, maintaining a good balance between the model complexity and model robustness is important in acoustic modelling. The use of top-down decision tree-based context clustering is a good and known solution to this problem. It has two advantages over bottom-up based approaches. First, by incorporating phonetic knowledge into a set of questions, it can assign unseen context-dependent phonemes to the leaf nodes of decision trees.

Second, the splitting procedure of the decision tree provides a way of keeping the balance of model complexity and robustness.

The decision tree-based context clustering technique aims to find a parameter tying structure (decision tree) and model parameters that maximizes the likelihood of the model to the training data. It can be written as:

$$(\hat{m}_{ML}, \hat{\lambda}_{ML}) = \underset{m,\lambda}{\mathrm{argmax}}\, p(O \mid m, \lambda) \tag{13}$$

$$= \underset{m,\lambda}{\mathrm{argmax}}\, \log p(O \mid m, \lambda) \tag{14}$$

where m denotes a parameter tying structure. The procedure of decision tree-based clustering will now be described with reference to FIG. 7.

Figure 7:
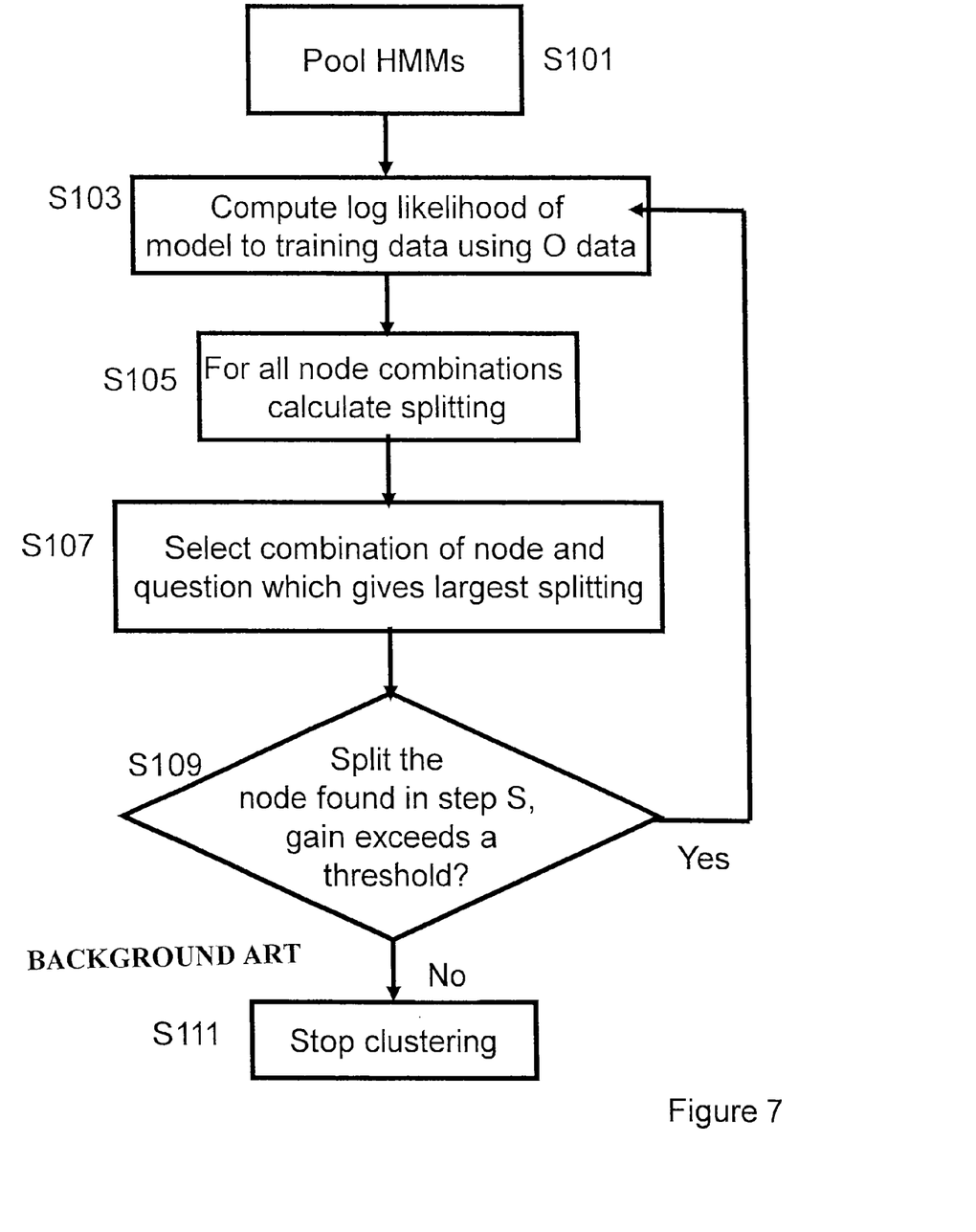
FIG. 7 is a flow diagram showing how decision trees are constructed in accordance with a known method.

In step S101, all context-independent phoneme HMMs are pooled at the root node of a decision tree;

In step S103, the log likelihood of the model to the training data is calculated using:

$$\mathcal{L} = \sum_{s \in S} -\frac{1}{2}(n(1 + \ln(2\pi)) + \ln(|\Sigma_s|)) \sum_{c=1}^{E} \sum_{t=1}^{T_e} \gamma_s^e(t) \tag{14a}$$

(the above equation has been taken from the PhD Thesis of Julian Odell, Cambridge University 1995.) where the likelihood is calculated over a set of models comprising the set of distributions S generating the training data O consisting of E examples, and where $\gamma_s^e(t)$ is the state occupancy at time t and $T_e$ is the total length of time of the speech of the E examples.

In step S105 for all combinations of nodes in the decision tree and pre-defined binary questions about contexts, the log likelihood of the model to the training data is computed after splitting the node by the question.

In step S107, the best combination of node and question that gives the largest gain in log likelihood is selected.

In step S109, the found node by the found question is split and is the gain in log likelihood exceeds a pre-defined threshold, the process returns to step S103.

If the gain is below the pre-defined threshold then the clustering stops in step S111.

The estimated parameter tying structure m and HMM parameters $\lambda$ are used as acoustic models for speech recognition and synthesis.

Figure 8:
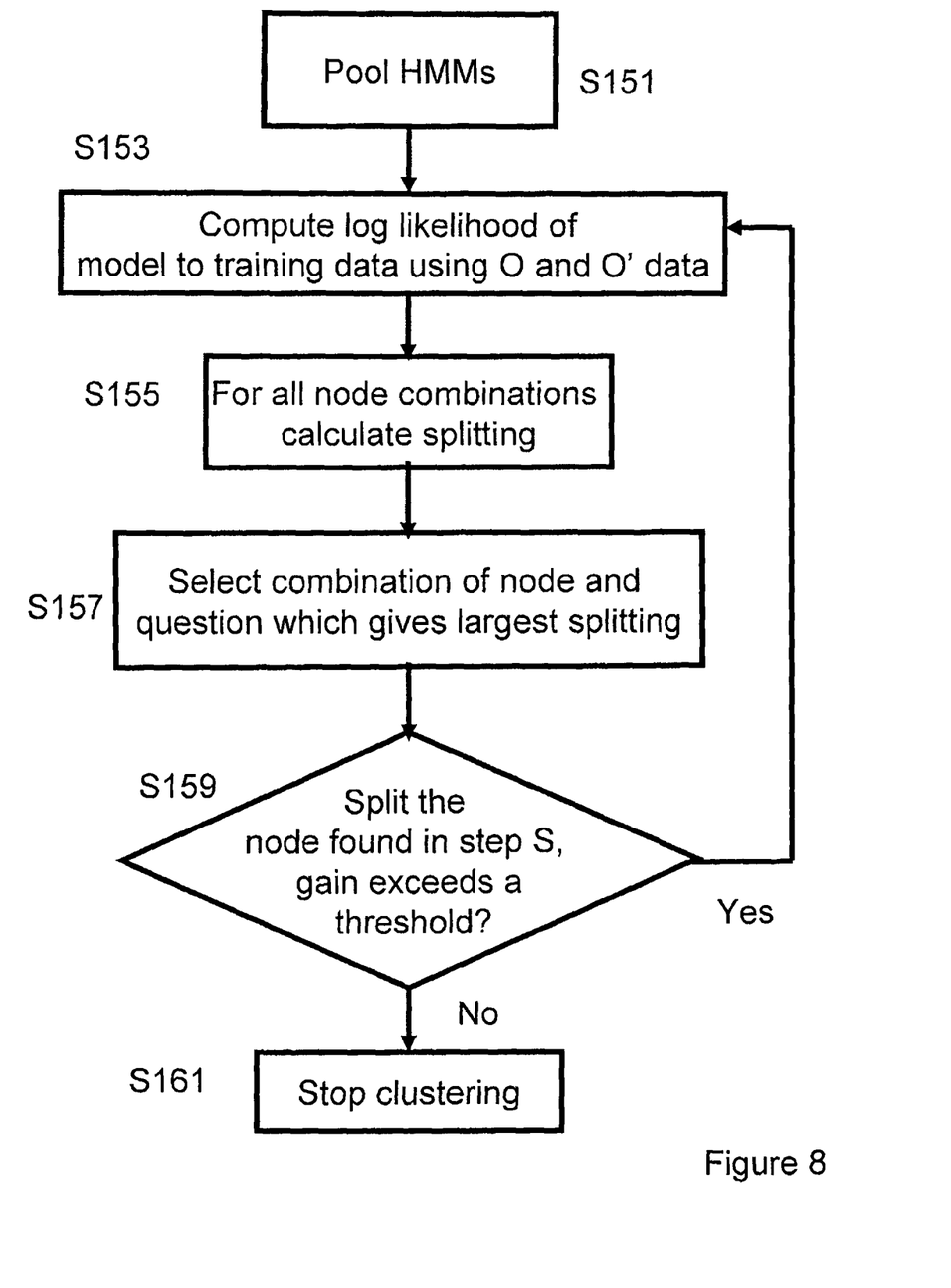
FIG. 8 is a flow diagram showing how decision trees are constructed in accordance with an embodiment useful for understanding the invention.

FIG. 8 shows a method in accordance with an embodiment of the present invention.

In contrast, in a method in accordance with an embodiment of the present invention. Here, instead of using the ML criterion, the MAP criterion is used in decision tree-based context clustering. It can be written as follows:

$$(\hat{m}_{MAP}, \hat{\lambda}_{MAP}) = \underset{m,\lambda}{\mathrm{argmax}}\, p(m, \lambda \mid O) \tag{15}$$

$$= \underset{m,\lambda}{\mathrm{argmax}}\, \frac{p(O, m, \lambda)}{p(O)} \tag{16}$$

$$= \underset{m,\lambda}{\mathrm{argmax}}\, \frac{p(O \mid m, \lambda)p(m, \lambda)}{p(O)} \tag{17}$$

$$= \underset{m,\lambda}{\mathrm{argmax}}\, p(O \mid m, \lambda)p(m, \lambda) \tag{18}$$

where $\rho(m, \lambda)$ denotes a joint prior distribution of the parameter tying structure and a set of HMM parameters. Next, how to define this joint prior distribution will be explained.

In adaptation by the MAP estimation for HMM-based statistical speech recognition and synthesis, hyper-parameters of prior distributions, which specify the characteristics of prior distributions, are usually set according to parameters of HMMs estimated by a large amount of training data (e.g., speaker-independent HMMs). It can be written as follows:

$$p(m,\lambda)=p(m,\lambda|O') \quad (19)$$

where O' denotes a large amount of training data to estimate parameters of HMMs and $p(m, \lambda|O')$ is a joint posteriori probability distribution of model structure m and model parameter $\lambda$. Using the Bayes' rule, Eq. (19) can be rewritten as follows:

$$p(m, \lambda | O') = \frac{p(O', m, \lambda)}{p(O')} \quad (20)$$

$$= \frac{p(O' | m, \lambda)p'(m, \lambda)}{p(O')} \quad (21)$$

where $p'(m, \lambda)$ is the joint prior distribution of m and $\lambda$ and $p'(O', |m, \lambda)$ is estimated. If $p'(m, \lambda)$ is a non-informative (uniform) distribution, the maximization problem of Eq. (18) can be rewritten as $$(\hat{m}_{MAP}, \hat{\lambda}_{MAP}) = \underset{m,\lambda}{\operatorname{argmax}}\, p(O | m, \lambda)\frac{p(O' | m, \lambda)p'(m, \lambda)}{p(O')} \quad (22)$$

$$= \underset{m,\lambda}{\operatorname{argmax}}\, p(O | m, \lambda)p(O' | m, \lambda) \quad (23)$$

$$= \underset{m,\lambda}{\operatorname{argmax}}\, \{\log p(O | m, \lambda) + \log p(O' | m, \lambda)\} \quad (24)$$

because both p(O') and p'(m, $\lambda$) are independent of maximization. Practically a parameter $\alpha$ is introduced to control the balance of contribution between O and O' as $$(\hat{m}_{MAP}, \hat{\lambda}_{MAP}) = \underset{m,\lambda}{\operatorname{argmax}}\,\{\log p(O | m, \lambda) + \alpha \cdot \log p(O' | m, \lambda)\} \quad (25)$$

Interestingly, this $\alpha$ works the same as the weight term in the MAP estimation of HMM parameters Equation (25) is almost the same as the decision tree-based context clustering based on the ML criterion (Eq. (14)). The essential difference is that the log likelihood of the model to O' is added. The tree construction process becomes the same as that of the ML criterion described in the previous section. The tree clustering process is shown in FIG. 8. Again, the difference is that the log likelihood of the model to O' is also considered. Therefore, this can be easily incorporated to the existing implementation of decision tree-based context clustering.

In FIG. 8, in step S151, HMMs are pooled in the same manner as described with reference to FIG. 7.

The log likelihood of model to training data using O and O' data is then performed in step S153. This uses equation 25 and the likelihood is computed using equation 14(a).

In the same manner as FIG. 7, for all node combinations splittings are calculated in step S155 and the combination of node and question which gives the largest splitting is selected in step S157. The node is then split in step S159. If the gain due to splitting exceeds a threshold, then the system loops back to step S153. If the gain does not exceed a threshold, then it means that the tree has been split to a sufficient degree and clustering is stopped in step S161.

The threshold is selected dependent on the accuracy required and computing considerations. If the threshold is set reasonably low, then the trees will be larger and more computing power will be required in order to run a model which uses trees constructed using the method of FIG. 8. However, if a larger threshold is used, then less questions will appear in the trees resulting in a loss of accuracy.

It has been previously described that when computing the log likelihood of model to training data using O and O' data, a parameter $\alpha$ is used in order to weight the O' distribution. $\alpha$ is chosen manually. In practice, a number of different $\alpha$ will be trialled and the best one will be selected. One possibility is to set $\alpha$ according to the amount of data of O and O'. For example, if O comprises an hour of speech data and O' comprises ten hours, then, $\alpha$ will be set to 1/10 which equals 0.1. Thus, in this situation, O and O' have the same amount of data imaginary.

A good $\alpha$ will be determined offline. For speech synthesis, speech samples will be synthesised from estimated HMMs sets (various $\alpha$) using test sentences and they will be listened to. The alpha which gives the best subjective listening test score will be selected. For recognition, a speech recogniser will be run with estimated HMMs sets (having various $\alpha$). For test utterances and check its recognition accuracy. The alpha which give the best recognition accuracy will be selected.

Next, a method of training a speech recogniser using a method in accordance with an embodiment of the present invention will be described with reference to FIGS. 9 and 10. The flowchart of FIG. 9 corresponds to basic training which will be performed for the O' data, the flowchart of FIG. 10 corresponds to training of the data using the O and O' data.

The O-data is the data which is used to initially train the model. This will be from a large number of speakers.

In step S201, monophone HMMs are initialised. This is to establish initial HMM parameters e.g. Gaussians variances etc for single phonemes. Initialising HMMs is well known and a number of techniques maybe used such as setting all means and variances to zero, setting all means and variances for each HMM to a global mean and variance or using prior data as an estimate for the means and variances of HMMs.

In step S203, embedded re-estimation is performed on monophone HMMs. This is used to re-estimate phoneme level HMMs on the basis of each segment. This is required because during speech recognition, better accuracy is obtained if parameters are correctly estimated for each segment. In an embodiment, embedded re-estimation is used where it is assumed that there is a soft assignment of one frame per state where there is a probability of a state being assigned to a frame. The Baum Welch algorithm or forward backward algorithm may also be used at this stage, both of these algorithms presume a soft assignment of frame to state. The viterbi algorithm may also be used which assumes a hard assignment of frame to state.

In step S205, monophone HMMs are copied to context dependence HMMs. Context dependent HMMs (e.g. triphones) have been described previously. A triphone comprises a middle or "current" phoneme with the preceding and succeeding phonemes. At this stage, all current phonemes i.e. the middle phoneme have the same statistics.

In step S207, embedded re-estimation is performed then on context dependent HMMs in step S207. This allows the HMMs to be estimated on the basis of whole sentences.

Next, decision tree context based clustering is performed in step S209. This is the same as that described with reference to FIG. 7. As this is the initial training which is performed on data set O', this will be purely performed on O' data.

Decision trees do not support HMM mixtures, therefore, the embedded re-estimation needs to be performed after the decision tree context based clustering has been performed in step S211.

Figure 9:
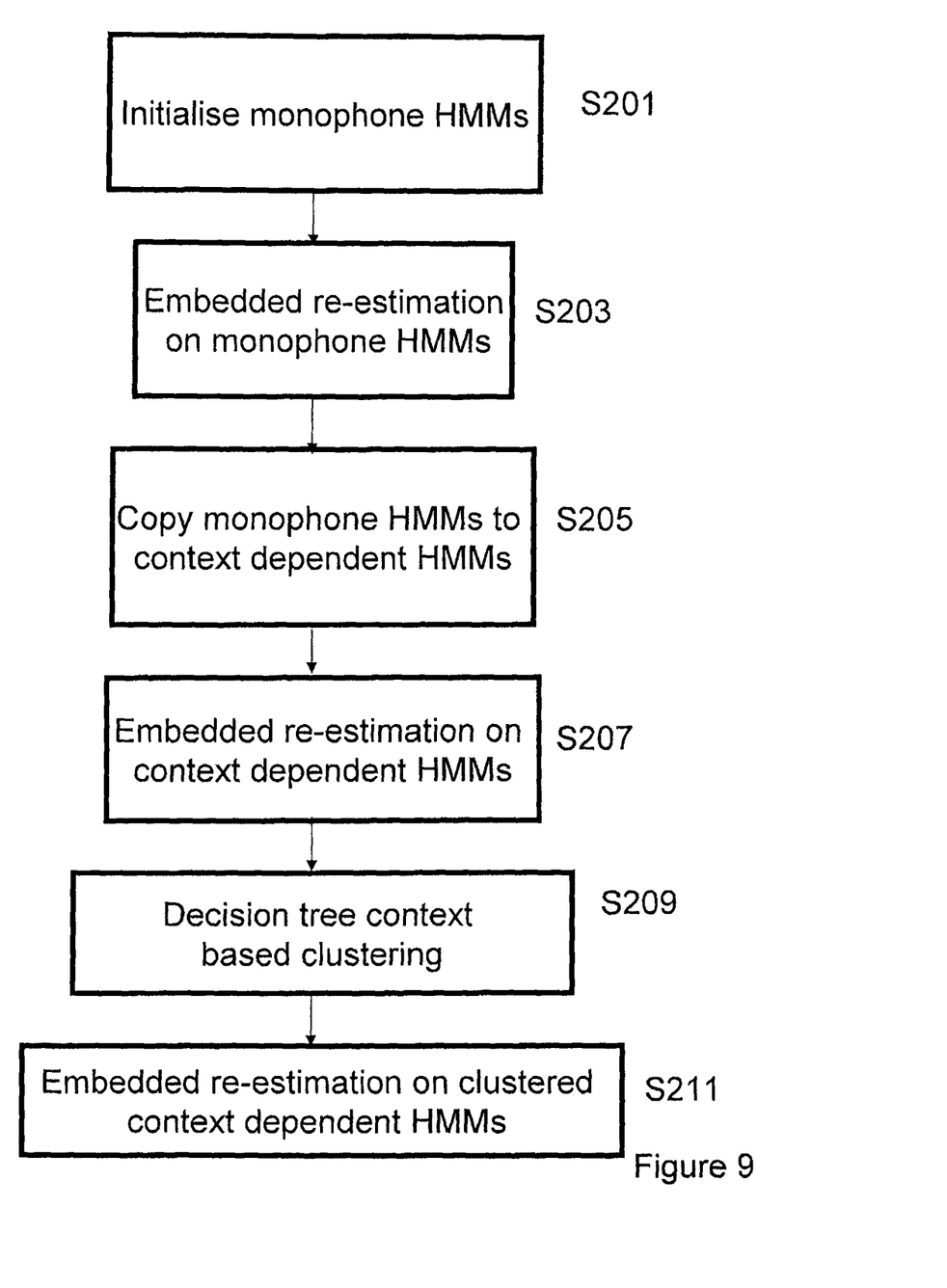
FIG. 9 is a flow diagram showing the basic steps for training an acoustic model.

As previously indicated, the steps of FIG. 9 are well-known for training acoustic models for both speech recognition and speech synthesis.

If the above is being used for training an acoustic model for speech synthesis, then the embedded re-estimation steps may be omitted as in general, a mixture of Gaussians is not used for an acoustic model for speech synthesis due to its large computational cost.

Figure 10:
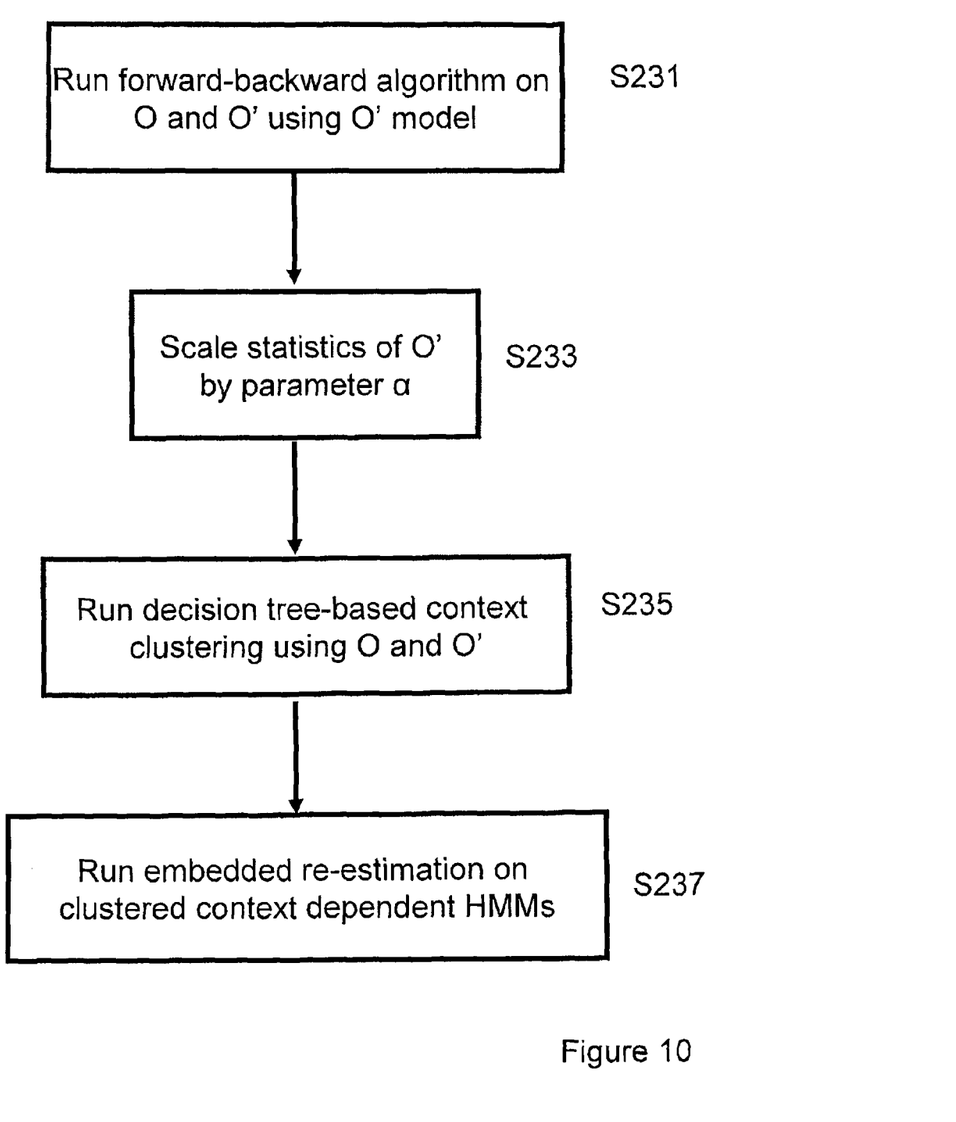
FIG. 10 is a schematic of the additional training steps required in accordance with an embodiment of the present invention for training a model for a specific speaker using both original data O' and new data O.

FIG. 10 is a method in accordance with an embodiment of the present invention where an O plus O' model is estimated. To estimate the O plus O' model, the O' model above is used to obtain the state level assignments of O (this is the state/frame assignments). This is performed using the well known forward-backward algorithm. The forward/backward algorithm computes forward and backward probabilities. Using the forward/backward probabilities, it is possible to compute the state-occupancy probabilities of HMM states for giving observation vectors. This state-occupancy probability corresponds to the "state-level assignments of O" referred to above. In addition to obtaining the state occupancy, the first and second order statistics are also obtained.

The state occupancy of a HMM state is the total sum of state-occupancy probabilities of this HMM state over the entire training data:

$$\gamma_c = \sum_{e=1}^{E} \sum_{t=1}^{T_e} \gamma_c^e(t)$$

The first order statistic for a HMM state is the total sum of state occupancy probability multiplied by the observation vector associated with this HMM state over the entire training data.

The second order statistic for HMM state is the total sum of state-occupancy probability multiplied by the observation vector squared associated with the HMM state over the entire training data or:

The first and second order statistics are related to the mean and variance as:

$$\mu_c = \frac{\sum_{e=1}^{E} \sum_{t=1}^{T_e} \gamma_c^e(t) o_t^e}{\gamma_c}$$

$$\Sigma_c = \frac{\sum_{e=1}^{E} \sum_{t=1}^{T_e} \gamma_c^e(t)(o_t^e - \mu_c)(o_t^e - \mu_c)'}{\gamma_c}$$

By using the above, it is possible to compute the mean and variance of a HMM.

Once the statistics have been obtained, they are scaled by parameter $\alpha$. Parameter $\alpha$ is the same as has been described with reference to the construction of the decision trees. The parameters are scaled as follows:

the occupancy will be $$\gamma_c = \sum_{e=1}^{E(O)} \sum_{t=1}^{T_e(O)} \gamma_c^e(t) + \alpha \sum_{e=1}^{E(O')} \sum_{t=1}^{T_e(O')} \gamma_c^e(t)$$

the mean derived from the first order statistics $$\mu_c = \frac{\sum_{e=1}^{E(O)} \sum_{t=1}^{T_e(O)} \gamma_c^e(t) + \alpha \sum_{e=1}^{E(O')} \sum_{t=1}^{T_e(O')} \gamma_c^e(t) o_t^e}{\gamma_c}$$

and the variance derived from the second order statistics as:

$$\Sigma_c = \frac{\sum_{e=1}^{E(O)} \sum_{t=1}^{T_e(O)} \gamma_c^e(t)(o_t^e - \mu_c)(o_t^e - \mu_c)' + \alpha \sum_{e=1}^{E(O')} \sum_{t=1}^{T_e(O')} \gamma_c^e(t)(o_t^e - \mu_c)(o_t^e - \mu_c)'}{\gamma_c}$$

Next, in step S235, decision tree based context clustering is performed using O and O'. This is performed in the same manner as described with relation to FIG. 8.

It should be noted that the forward-backward algorithm is run with the O' model and with state tying structure performed in step S209. However, decision tree-based context clustering of step S235 requires "untied" statistics, i.e., each individual context-dependent model has its own occupation counts, 1st and 2nd-order statistics which are accumulated only on itself.

When step S235 has been performed, step 237 is performed where embedded re-estimation is performed on clustered context dependent HMMs. Again, this step may be omitted if the acoustic model is to be used for speech synthesis since mixture Gaussians are not usually used.

The training of the first and second models can take place at a manufacturer's premises. However, it is also possible for a speech processing product to be produced which has just been trained with the initial training data. The product could then be later trained with the second training data.

Figure 11:
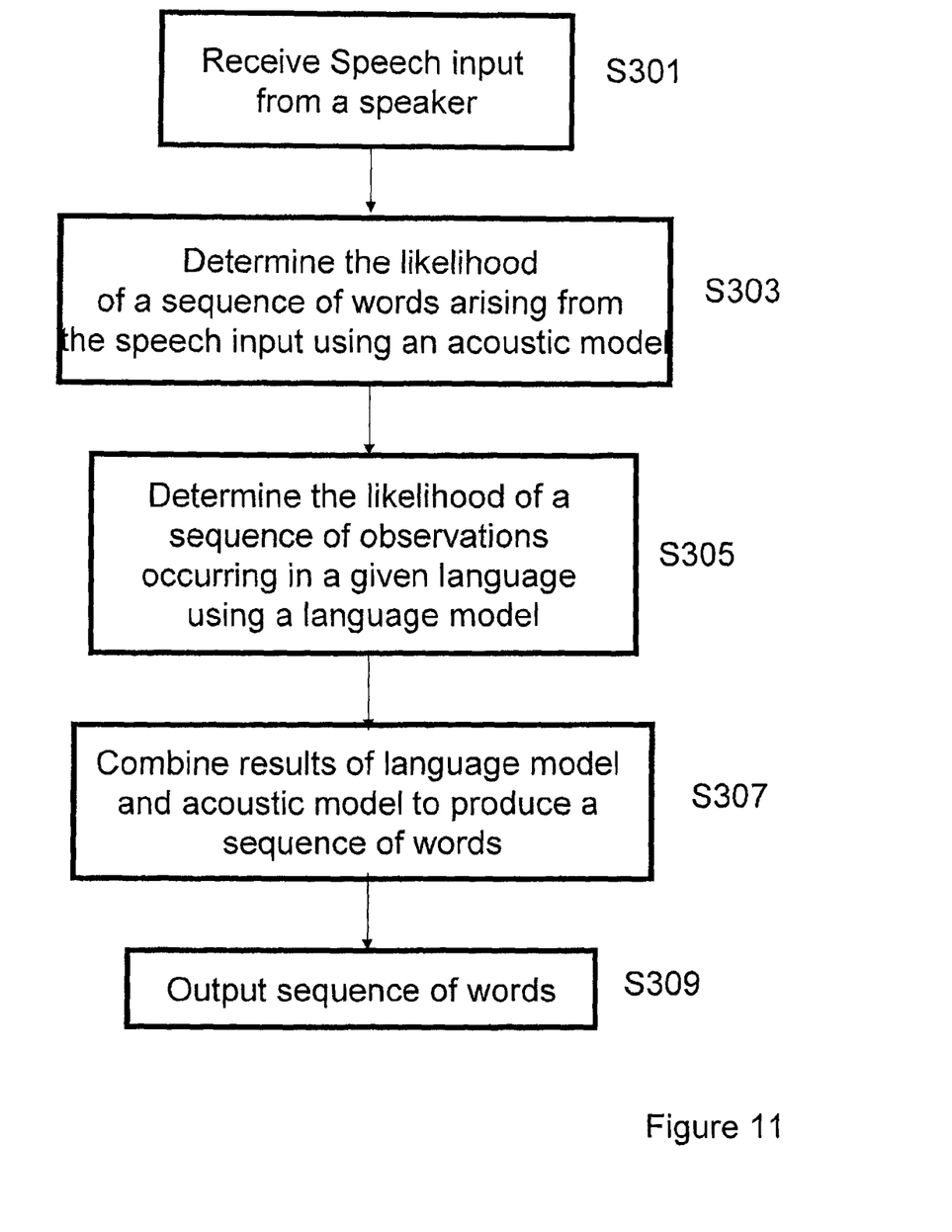
FIG. 11 is a schematic flow diagram showing the method in accordance with an embodiment of the present invention for speech recognition.

In FIG. 11, the present invention can be used in a speech recognition system. In a speech recognition system the basic steps as set out in FIG. 11 will be performed.

In step S301, input speech is received from a speaker. The system would preferably have been trained for that speaker using the speaker data O.

In step S303, the likelihood of a sequence of words arriving from the speech input is determined using the acoustic model which has been trained as explained with reference to FIGS. 9 and 10. Next, in step S305, the likelihood of a sequence of observations occurring in a given language is evaluated using the language model. In step S307, the results of the language model and acoustic model are combined to produce a sequence of words. The sequence of words is outputted in step S309. The sequence of words could be outputted on a monitor, or directed into a search engine, directed into a SatNav system etc. In one embodiment, the outputted sequence of words is then directed into a translation system where it is translated into a second language.

Figure 12:
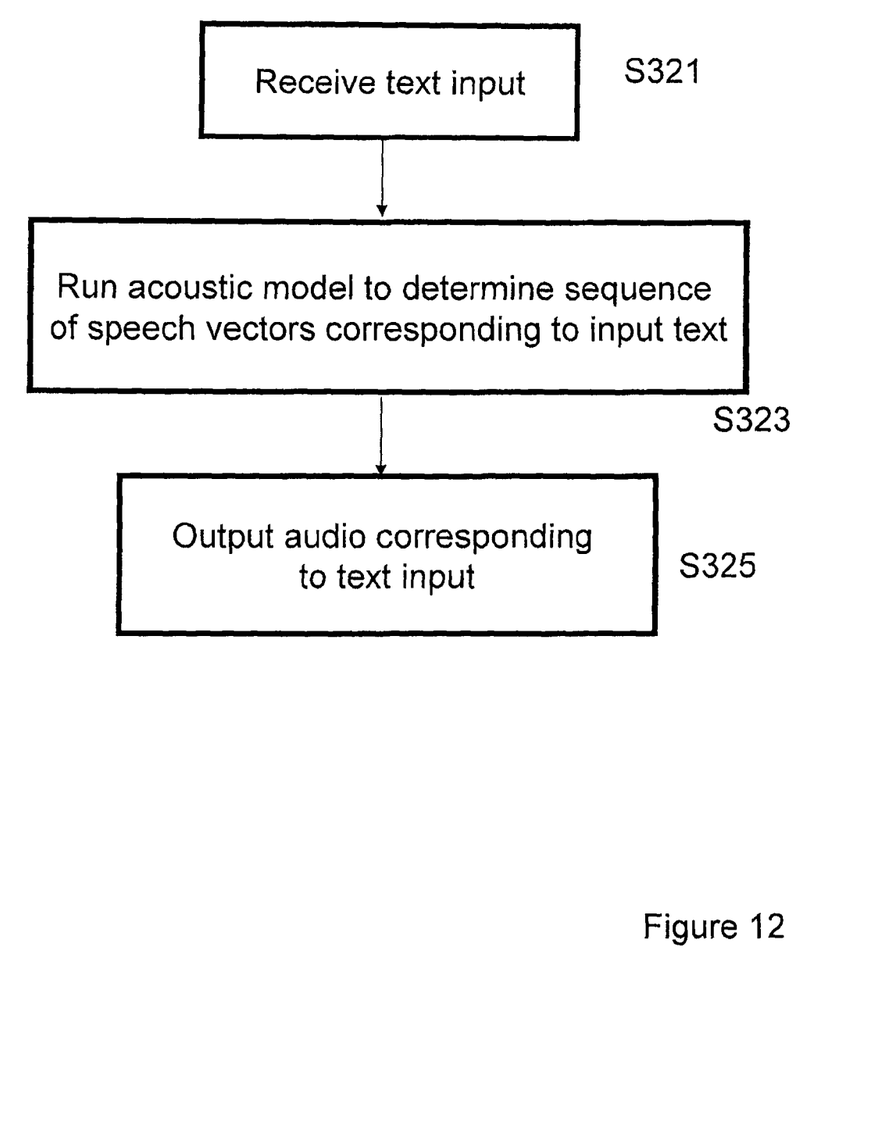
FIG. 12 is a flow diagram in accordance with an embodiment of the present invention for speech synthesis.

FIG. 12 shows a very simple system for speech synthesis. In step S321, a text input is received. This text input may be from a data file or may be inputted directly to computer.

An acoustic model is then run to determine the sequence of speech vectors corresponding to the input text in step S323. Audios output then corresponding to the text input in step S325.

For a speech-to-speech translation system, FIG. 11 and FIG. 12 could be run one after the other with the output from step S309 of FIG. 11 being translated into a different language and inputted as text input 321 in FIG. 12.

While certain embodiments have been described, these embodiments have been presented by way of example only, and are not intended to limit the scope of the invention. Indeed, the novel methods, apparatus and systems described herein may be embodied in a variety of other forms; furthermore, various omissions, substitutions and changes in the form of the methods, apparatus and systems described herein may be made without departing from the spirit of the inventions. The accompanying claims and their equivalents are intended to cover such forms of modifications as would fall within the scope and spirit of the inventions.

The invention claimed is:

1. A speech recognition method executed by processing circuitry programmed to implement speech recognition, said method comprising:
receiving a speech input from a speaker which comprises a sequence of observations; and
determining, using the processing circuitry, a likelihood of a sequence of words arising from the sequence of observations using an acoustic model, said acoustic model having a plurality of model parameters describing probability distributions which relate a word or part thereof to an observation, said acoustic model having been trained using first training data and adapted using second training data to said speaker,
determining, using the processing circuitry, a likelihood of a sequence of observations occurring in a given language using a language model; and
combining, using the processing circuitry, the likelihoods determined by the acoustic model and the language model and outputting a sequence of words identified from said speech input signal,
wherein said acoustic model is context based for said speaker, said context based information being contained in said model using a plurality of decision trees, the structure of said decision trees being based on second training data, the decision trees splitting at nodes and wherein the structure is determined from the splitting of the nodes of the trees that has been calculated using maximum a posteriori criteria implemented as:

$$(\hat{m}_{MAP}, \hat{\lambda}_{MAP}) = \underset{m,\lambda}{\mathrm{argmax}} \{\log p(O \mid m, \lambda) + \alpha \cdot \log p(O' \mid m, \lambda)\}$$

where O' is the first training data, O is the second training data, m denotes a parameter tying structure, $\lambda$ is a set of HMM parameters, $\hat{m}_{MAP}$ denotes the parameter tying structure under maximum a posteriori criteria, $\hat{\lambda}_{MAP}$ are the HMM parameters under maximum a posteriori criteria and $\alpha$ is a parameter to be set.

2. The speech recognition method according to claim 1, wherein the structure of the decision trees is based on both the first and second training data.

3. The method according to claim 1, wherein the context dependency is implemented as tri-phones.

4. The method according to claim 1, wherein said acoustic model comprises probability distributions which are represented by means and variances and wherein said decision trees are provided for both means and variances.

5. The method according to claim 1, wherein said context based information is selected from phonetic, linguistic and prosodic contexts.

6. The method according to claim 1, wherein said decision trees are used to model at least one selected from expressive contexts, gender, age or voice characteristics.

7. A non-transitory computer readable carrier medium carrying computer readable instructions for controlling the computer to carry out the method of claim 1.

8. A text to speech processing method executed by processing circuitry programmed to implement text to speech processing, comprising:
receiving a text input which comprises a sequence of words; and
determining, using the processing circuitry, a likelihood of a sequence of speech vectors arising from the sequence of words using an acoustic model, said acoustic model having a plurality of model parameters describing probability distributions which relate a word or part thereof to an observation, said acoustic model having been trained using first training data and adapted using second training data to a speaker,
wherein said acoustic model is context based for said speaker, said context based information being contained in said model using a plurality of decision trees, the structure of said decision trees being based on second training data, the decision trees splitting at nodes and wherein the structure is determined from the splitting of the nodes of the trees that has been calculated using maximum a posteriori criteria implemented as:

$$(\hat{m}_{MAP}, \hat{\lambda}_{MAP}) = \underset{m,\lambda}{\mathrm{argmax}} \{\log p(O \mid m, \lambda) + \alpha \cdot \log p(O' \mid m, \lambda)\}$$

where O' is the first training data, O is the second training data, m denotes a parameter tying structure, $\lambda$ is a set of HMM parameters, $\hat{m}_{MAP}$ denotes the parameter tying structure under maximum a posteriori criteria, $\hat{\lambda}_{MAP}$ are the HMM parameters under maximum a posteriori criteria and $\alpha$ is a parameter to be set.

9. A speech recognition apparatus comprising:
a receiver for receiving a speech input from a speaker which comprises a sequence of observations; and
processing circuitry programmed to implement speech recognition and configured to:
determine a likelihood of a sequence of words arising from the sequence of observations using an acoustic model, said acoustic model having a plurality of model parameters describing probability distributions which relate a word or part thereof to an observation, said acoustic model having been trained using first training data and adapted using second training data to said speaker;
determine a likelihood of a sequence of observations occurring in a given language using a language model; and
combine the likelihoods determined by the acoustic model and the language model and outputting a sequence of words identified from said speech input signal,
wherein said acoustic model is context based for said speaker, said context based information being contained in said model using a plurality of decision trees, the structure of said decision trees being based on second training data, the decision trees splitting at nodes and wherein the structure is determined from the splitting of the nodes of the trees that has been calculated using maximum a posteriori criteria implemented as:

$$(\hat{m}_{MAP}, \hat{\lambda}_{MAP}) = \underset{m,\lambda}{\mathrm{argmax}}\{\log p(O \mid m, \lambda) + \alpha \cdot \log p(O' \mid m, \lambda)\}$$

where O' is the first training data, O is the second training data, m denotes a parameter tying structure, $\lambda$ is a set of HMM parameters, $\hat{m}_{MAP}$ denotes the parameter tying structure under maximum a posteriori criteria, $\hat{\lambda}_{MAP}$ are the HMM parameters under maximum a posteriori criteria and $\alpha$ is a parameter to be set.

10. A text to speech system comprising:
a receiver for receiving a text input which comprises a sequence of words; and
processing circuitry programmed to implement text to speech processing and configured to:
determine a likelihood of a sequence of speech vectors arising from the sequence of words using an acoustic model, said acoustic model having a plurality of model parameters describing probability distributions which relate a word or part thereof to an observation, said acoustic model having been trained using first training data and adapted using second training data to said speaker,
wherein said acoustic model is context based for said speaker, said context based information being contained in said model using a plurality of decision trees, the structure of said decision trees being based on second training data, the decision trees splitting at nodes and wherein the structure is determined from the splitting of the nodes of the trees that has been calculated using maximum a posteriori criteria implemented as:

$$(\hat{m}_{MAP}, \hat{\lambda}_{MAP}) = \underset{m,\lambda}{\mathrm{argmax}}\{\log p(O \mid m, \lambda) + \alpha \cdot \log p(O' \mid m, \lambda)\}$$

where O' is the first training data, O is the second training data, m denotes a parameter tying structure, $\lambda$ is a set of HMM parameters, $\hat{m}_{MAP}$ denotes the parameter tying structure under maximum a posteriori criteria, $\hat{\lambda}_{MAP}$ are the HMM parameters under maximum a posteriori criteria and $\alpha$ is a parameter to be set.

11. The speech to speech translation system, said system comprising:
a speech recognition system configured to recognize speech in a first language,
a translation module configured to translate text received in a first language into text of a second language, and
a text to speech system configured to output speech in said second language,
wherein the speech recognition apparatus comprises:
a receiver for receiving a speech input from a speaker which comprises a sequence of observations; and
processing circuitry programmed to implement speech recognition and configured to:
determine a likelihood of a sequence of words arising from the sequence of observations using an acoustic model, said acoustic model having a plurality of model parameters describing probability distributions which relate a word or part thereof to an observation, said acoustic model having been trained using first training data and adapted using second training data to said speaker;
determine a likelihood of a sequence of observations occurring in a given language using a language model; and
combine the likelihoods determined by the acoustic model and the language model and outputting a sequence of words identified from said speech input signal,
wherein said acoustic model is context based for said speaker, said context based information being contained in said model using a plurality of decision trees, the structure of said decision trees being based on second training data, the decision trees splitting at nodes and wherein the structure is determined from the splitting of the nodes of the trees that has been calculated using maximum a posteriori criteria implemented as:

$$(\hat{m}_{MAP}, \hat{\lambda}_{MAP}) = \underset{m,\lambda}{\mathrm{argmax}}\{\log p(O \mid m, \lambda) + \alpha \cdot \log p(O' \mid m, \lambda)\}$$

where O' is the first training data, O is the second training data, m denotes a parameter tying structure, $\lambda$ is a set of HMM parameters, $\hat{m}_{MAP}$ denotes the parameter tying structure under maximum a posteriori criteria, $\hat{\lambda}_{MAP}$ are the HMM parameters under maximum a posteriori criteria and $\alpha$ is a parameter to be set, and
wherein the text to speech system comprises:
a receiver for receiving a text input which comprises a sequence of words; and
processing circuitry programmed to implement text to speech processing and configured to:
determine a likelihood of a sequence of speech vectors arising from the sequence of words using an acoustic model, said acoustic model having a plurality of model parameters describing probability distributions which relate a word or part thereof to an observation, said acoustic model having been trained using first training data and adapted using second training data to said speaker,
wherein said acoustic model is context based for said speaker, said context based information being contained in said model using a plurality of decision trees, the structure of said decision trees being based on second training data, the decision trees splitting at nodes and wherein the structure is determined from the splitting of the nodes of the trees that has been calculated using maximum a posteriori criteria implemented as:

$$(\hat{m}_{MAP}, \hat{\lambda}_{MAP}) = \underset{m,\lambda}{\mathrm{argmax}}\{\log p(O \mid m, \lambda) + \alpha \cdot \log p(O' \mid m, \lambda)\}$$

where O' is the first training data, O is the second training data, m denotes a parameter tying structure, $\lambda$ is a set of HMM parameters, $\hat{m}_{MAP}$ denotes the parameter tying structure under maximum a posteriori criteria, $\hat{\lambda}_{MAP}$ are the HMM parameters under maximum a posteriori criteria and $\alpha$ is a parameter to be set.

* * * * *